(12) United States Patent
Centola et al.

(10) Patent No.: US 8,713,143 B2
(45) Date of Patent: Apr. 29, 2014

(54) ESTABLISHING A SOCIAL NETWORK (75) Inventors: Damon M. T. Centola, Cambridge, MA (US); Nicholas A. Christakis, Concord, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 249 days.

(21) Appl. No.: 11/809,328

(22) Filed: May 31, 2007

(65) Prior Publication Data
US 2008/0270615 A1 Oct. 30, 2008

Related U.S. Application Data (60) Provisional application No. 60/926,639, filed on Apr. 27, 2007.

(51) Int. Cl.
*G06F 15/173* (2006.01)

(52) U.S. Cl.
USPC .............. 709/223; 709/204; 705/319

(58) Field of Classification Search
USPC .................. 709/204, 223; 705/319
See application file for complete search history.

(56) References Cited

U.S. PATENT DOCUMENTS

| | | | |
|---|---|---|---|
| 2004/0088325 A1* | 5/2004 | Elder et al. | 707/104.1 |
| 2004/0122693 A1* | 6/2004 | Hatscher et al. | 705/1 |
| 2004/0122803 A1 | 6/2004 | Dom et al. | |
| 2005/0049908 A2* | 3/2005 | Hawks | 705/10 |
| 2005/0171799 A1 | 8/2005 | Hull et al. | |
| 2005/0256949 A1* | 11/2005 | Gruhl et al. | 709/223 |
| 2006/0190536 A1 | 8/2006 | Strong et al. | |
| 2006/0200434 A1 | 9/2006 | Flinn et al. | |
| 2007/0112719 A1 | 5/2007 | Reich et al. | |

OTHER PUBLICATIONS

D. J. Watts & Steven H. Strogatz, Collective dynamics of 'small-world' networks, Jun. 1998, pp. 440-442 http://www.nature.com/nature/journal/v393/n6684/pdf/393440a0.pdf.*
Kempe et al., "Maximizing the Spread of Influence through a Social Network," *Proceedings of the ninth ACM SIGKDD international conference( SIGKDD)*, pp. 137-146 (2003).
Centola et al., "Cascade dynamics of complex propagation," *Physica A*, 374:449-456 (2007).
Centola et al., "Complex contagions and the weakness of long ties," *American Journal of Sociology* (2006) 99:640-67.
Centola, "Failure in complex social networks" (2007).
http://www.smallworldlabs.com.
http://www.liveworld.com/solution.
http://www.leveragesoftware.com.
International Search Report and the Written Opinion of the International Searching Authority, Aug. 29, 2008.

* cited by examiner

*Primary Examiner* — Liangche A Wang
*Assistant Examiner* — Cheikh Ndiaye
(74) *Attorney, Agent, or Firm* — Wolf, Greefield & Sacks, P.C.

(57) ABSTRACT

A method of creating social networks designed to facilitate diffusion of desired behavior among groups of people. A social network may be created prior to assigning people to nodes in the network. Communications between people in the network may be controlled and modified to promote diffusion of the desired behavior.

28 Claims, 7 Drawing Sheets

ESTABLISHING A SOCIAL NETWORK

RELATED APPLICATIONS

This application claims the benefit under 35 U.S.C. §119(e) to U.S. Provisional Application Ser. No. 60/926,639, entitled "ESTABLISHING A SOCIAL NETWORK," filed on Apr. 27, 2007, which is incorporated herein by reference in its entirety.

FIELD OF INVENTION

The present application relates to social networks.

DESCRIPTION OF THE RELATED ART

Social networks typically are formed as a result of interaction (e.g., communication) among a group of people. As a result, a social network typically has no pre-specified structure and develops as people in the network interact. A social network may be represented via a collection of nodes that represent people in the network, and a collection of edges that each extends between two nodes and represents interaction between the people associated with those nodes.

SUMMARY OF THE INVENTION

One embodiment is directed to a method for use with an on-line computer service having a plurality of account holders that each has at least one account with the on-line computer service. The method comprises acts of: (A) creating a social network among at least a subset of the plurality of account holders by: (A1) creating a network architecture comprising a set of nodes and a set of edges, wherein each one of the edges connects at least two of the nodes and specifies a path for a flow of information between the nodes connected by the one of the edges; and (A2) populating the network architecture by assigning each of the account holders in the at least a subset of the plurality of account holders to at least one of the nodes so that when at least one action is taken by a first account holder assigned to a first node, information relating to the at least one action is communicated to at least one second account holder assigned to a second node that is directly connected via at least one of the edges to the first node.

Another embodiment is directed to a method for use with an on-line computer service having a plurality of account holders that each has at least one account with the on-line computer service. The method comprises acts of: (A) assigning a pre-specified topology of interpersonal social ties to otherwise anonymous users who comprise at least a subset of the plurality of account holders for the purpose of facilitating the spread of behavior among the users by: (A1) creating a network architecture comprising a set of nodes and a set of edges, wherein each one of the edges connects exactly two of the nodes and specifies a path for a flow of information between the nodes connected by the one of the edges, the network architecture comprising a pre-specified degree distribution, clustering coefficient, characteristic path length, and average bridge width between nodes; and (A2) populating the network architecture by assigning each of the account holders in the at least a subset of the plurality of account holders to at least one of the nodes so that when at least one action is taken by a first account holder assigned to a first node, information relating to the at least one action is communicated to at least one second account holder assigned to a second node that is directly connected via at least one of the edges to the first node.

A further embodiment is directed to a method of using an on-line computer service having a plurality of account holders that each has at least one account with the on-line computer service, the method performed via a first account holder having a first account with the on-line computer service. The method comprises acts of: (A) receiving at least one communication providing the first account holder with information about at least one behavior of at least one other account holder who is a neighbor of the first account holder in a social network created by the on-line service.

DETAILED DESCRIPTION

Encouraging people to adopt some desired behaviors (e.g., using a new service, buying a new product, joining a new group) may be challenging since the behavior may be costly and/or people may have reservations about investing their time and/or money to engage in the behavior. Applicants have appreciated that peer influence can be an effective mechanism for influencing behavior adoption. However, it conventionally has been difficult to exploit peer influence in the context of some communities. One example of such communities is anonymous on-line communities such as those comprised of subscribers to a conventional on-line service. Some on-line services employ broadcast messages across a population of users about what products or services other users have bought or used. However, Applicants have appreciated that while broadcast messages may reach many people, they frequently have little relevance to particular individuals, and have little impact on their decision-making. People are usually far more influenced by a small group of people who they know (e.g., their friends) than by a larger group of strangers. Thus, Applicants have appreciated the desirability of developing a technique for creating community interaction in relatively small groups of people that can produce adoption of one or more desired behaviors across a large group of people. Applicants have further appreciated that social networking techniques can be employed for this purpose.

Some embodiments of the present invention are directed to implementing a structured social network designed to facilitate diffusion of one or more desired behaviors among a group of people. In one embodiment, the network structure (e.g., nodes and edges) may be determined before particular users are assigned to the nodes. The network may be designed to have a structure and parameters that facilitate interactions between a group of people so that the interactions promote spreading of a desired behavior among them. The group of people that populate the social network can be considered to be members of a community. The community may have been previously defined through some commonality among the members of the group (e.g., as members of an organization, subscribers to an on-line service, etc.) or alternatively, may simply be defined by the social network for a group of people that had no previous association, as the techniques described herein are not limited in this respect.

One application described below for the techniques described herein is to create a social network for users (e.g., account holders) of an on-line computer service that may be considered to constitute an on-line community. However, it shall be appreciated that this is merely an example, as the present invention is not limited in this respect, and can be used to implement a social network among any group of people in any context.

In accordance with one embodiment, a social network is created for all or any subset of the users (e.g., account holders or subscribers) of an on-line service. A group of users (e.g., people who have accounts or subscriptions) of an on-line service or website typically are anonymous, and have no means for meaningful interaction or peer influence. Using conventional techniques, a website (e.g., whether already well established or just creating its user base) has no vehicle for creating meaningful connections among its new users. Chat groups and forums have been used in some sites. However, these do not allow the site to control or influence the interactions of the users to foster the spread of a desired behavior, such as buying a product or service, exhibiting a particular health behavior, helping to recruit new members, etc. By contrast, one aspect of the invention provides a technique for designing a social network architecture and embedding users into the network to create a previously non-existent networked community that provides a mechanism for facilitating the diffusion of one or more desired behaviors through that community. The social network may comprise a set of nodes and a set of edges that each connects at least two of the nodes and specifies a path for a flow of information between them. The network architecture may be populated by assigning one or more of the users (e.g., account holders) to each of the nodes so that when a user takes an action (e.g., exhibits a behavior), information relating to the action is communicated to his/her neighbors in the network (i.e., those users populating nodes directly connected to the actor's node). The network architecture may be selected to promote spread of the desired behavior and may be implemented into the website in any suitable way to provide a pre-specified structure for social interaction.

As mentioned above, a network architecture may include a set of nodes (N) and a set of edges (E) which connect the nodes. Each node may be connected to Z other nodes of the network. Therefore, Z specifies a size of a node's neighborhood, i.e., a set of neighbors of the node in the network. The neighborhood size Z may be constant throughout the network or may vary for different nodes. In this respect, it should be appreciated that the aspects of the present invention described herein are not limited to use with a network that comprises any particular number of nodes or has any particular structure and shape, and can be used with networks having any suitable number of nodes and any suitable structure and shape. A network structure may be characterized using a number of measures including, for example, degree distribution (the variance in Z across nodes), clustering coefficient (the number of nodes whose neighbors are neighbors of each other), characteristic path length (an average distance between two randomly chosen nodes), frequency of wide bridges, a fraction of closed triads given the possible number of closed triads, a mean geodesic between all nodes, the average fraction of neighborhood overlap between non-neighbors, a distribution of degree centrality in the network, and other suitable measures. The aspects of the present invention described herein are not limited to use with networks having any particular constraints on any of these (or any other) measures, and can be employed with networks having any desired architecture.

In one embodiment, a network structure may be created for a group of users before determining which particular users are to be assigned to which particular nodes, so that the network is a pre-existing structure that is designed to both facilitate and control the interactions of members of the community. However, it should be appreciated that all embodiments of the invention are not limited in this respect. For example, at least some portions of the network structure may be specified only after other portions of the network have had their nodes populated with particular users.

In some of the illustrative examples described herein, a single social network is defined for a group of users. However, it should be appreciated that the aspects of the present invention described herein are not limited in this respect, and that two or more social networks may be defined for a same (or some subset of) group of users. Multiple social networks may be defined for any of numerous reasons, including to encourage different types of behavior. When multiple social networks are used for a group of users, the networks may have the same or different network topologies and/or the users may be assigned to the nodes in the network using the same or different assignment parameters. For example, if multiple social networks are employed for a common group of users to encourage different types of behavior, different network topologies can be designed to best encourage the different types of desired behavior and/or the assignments of particular users to particular nodes may be performed based upon different characteristics intended to encourage the different types of desired behavior. Examples of techniques for designing a network topology to encourage certain types of desired behavior are discussed below. Similarly, examples of techniques for assigning particular users to particular nodes to best encourage certain types of behavior are also discussed below.

As should be appreciated from the foregoing, according to some embodiments of the invention, one or more social networks may be designed to create one or more communities of social interaction for a group of people (e.g., users of an on-line service or other groups). People may be embedded into the network by being assigned to particular nodes in any suitable manner, examples of which are described below. In some embodiments, the users may be anonymous to one another (i.e., they may not know each other) prior to creation of the network. However, the invention is not limited in this respect and can be used to create a social network among users who may know each other (e.g., via some sort of previously existing association or social structure) prior to being embedded in the network.

After a particular network node has been selected for a user to be assigned to using any suitable selection criteria, some technique may be employed to associate the person with the selected node. Any suitable association technique can be employed, as the aspects of the present invention described herein are not limited in this respect. In accordance with one embodiment of the present invention, the person may be assigned an identifier that uniquely identifies a node, n, in the network to which the person has been assigned. This unique identifier (e.g., referred to as a NetNodeID) may correspond to the person's node n and identify the exact position of the person in the social network. Thus, each node in the network may be provided with a unique identifier, and people may be associated with their corresponding nodes using these unique identifiers. In accordance with the embodiment wherein each person is a user (e.g., an account holder) of an on-line service, the NetNodeID may be stored with other information defining the user's profile or account, such as a user identifier, password or other distinguishing monikers. Of course, the aspects of the present invention described herein are not limited to creating social networks for users of an on-line service or to associating users with their assigned nodes using a NetNodeID, as any suitable technique can be employed.

Figure 1:
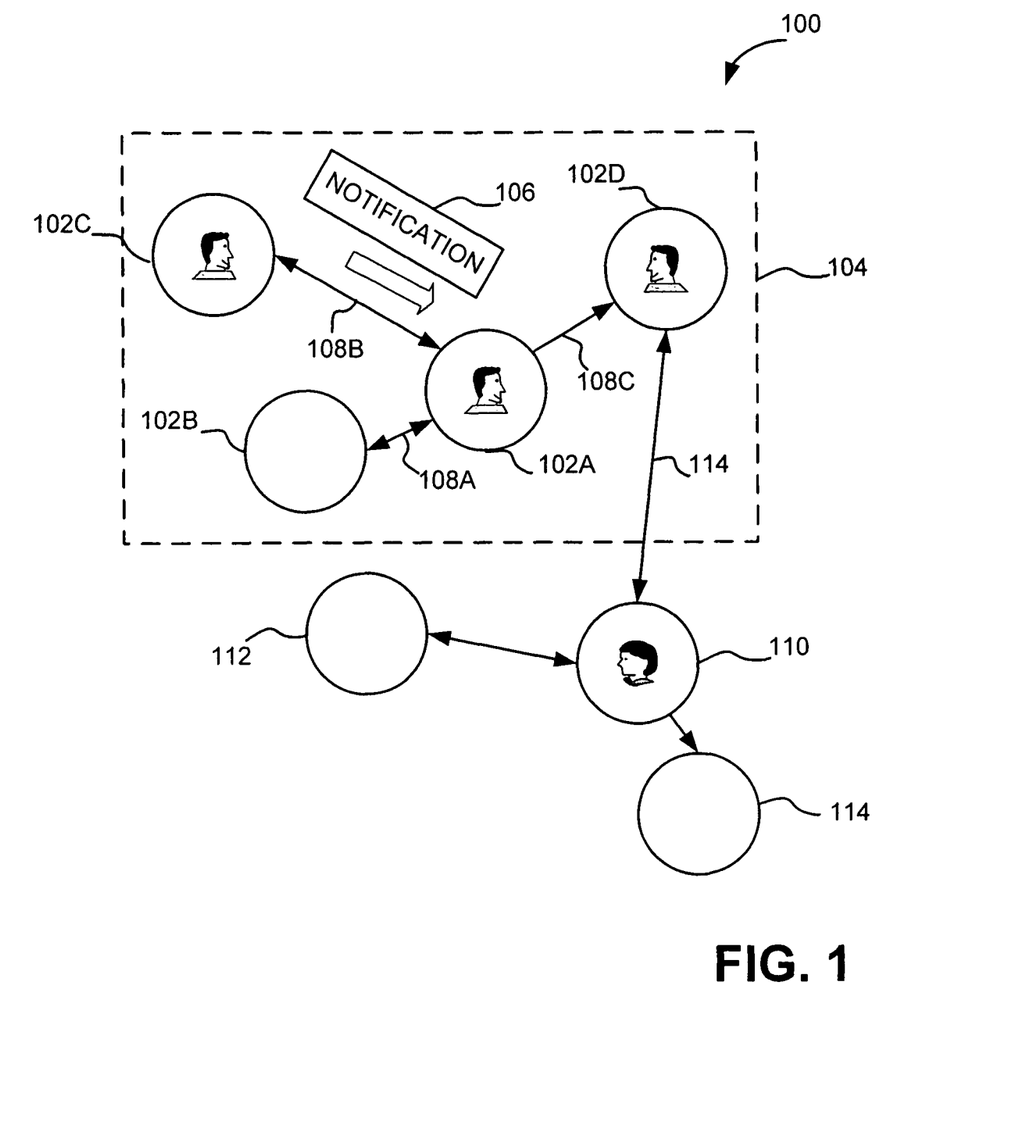
FIG. 1 is a conceptual illustration of a social network.

FIG. 1 illustrates an example of a network 100 that may be implemented according to one embodiment of the invention. In the example illustrated in FIG. 1, the network 100 comprises nodes 102A-102D, 110, 112 and 114. Nodes 102A, 102C, 102D and 110 each has a respective person assigned to it, while nodes 102B, 112 and 114 are not associated with any people. The people may be, for example, users of an on-line computer service or any other group of people. The nodes of the network 100 are connected by edges. For example, edge 108A connects nodes 102A and 102B, edge 108B connects nodes 102A and 102C, and edge 108C connects nodes 102A and 102D. Each edge reflects a flow of communication between two nodes. In some embodiments, communication flow may be constrained to a single direction, so that an action taken by a user associated with one node may be communicated to the user associated with the other, but not vice versa. Alternatively, in other embodiments, a flow of communication may be bidirectional, such that an action taken by a user associated with either of two nodes connected directly via an edge may result in a communication flowing to the other node. This is illustrated in FIG. 1 via the edges 108A, 108B and 114 having arrows pointing in both directions to illustrate bidirectional communication, and via the edge 108C having an arrow flowing in a single direction to illustrate unidirectional communication. It should be appreciated that social networks can be employed that mix unidirectional and bidirectional communication between neighboring nodes as shown in FIG. 1, or social networks can be developed that constrain such communication to a single type (either unidirectional or bidirectional), as the aspects of the present invention described herein are not limited in this respect. As mentioned above, the present invention is not limited to use with networks that comprise any particular number of nodes or have any particular structure, and can employ networks having any suitable number of nodes and any suitable structure.

Nodes that are directly connected by an edge (e.g., nodes 102A and 102B in FIG. 1) are referred to as neighbors in the network. Thus, each node n may have a fixed network neighborhood d, the members of which are the Z nodes to which n is directly linked in the social network. In the example illustrated in FIG. 1, node 102A has three neighbors, i.e., nodes 102B, 102C and 102D. Therefore, a neighborhood 104 for node 102A has three neighbors and may be considered to have a size Z of three.

It should be appreciated that the present invention is not limited to networks having neighborhoods of any particular size, as any suitable number of neighboring nodes may be established for a node. However, Applicants have appreciated that for some applications, constraining the number of neighbors for a node may be advantageous, and that for certain types of desired behavior in certain contexts, feedback from a relatively small group of users may be sufficient to influence the desired behavior. This, in some circumstances, providing a larger than necessary number of neighbors may provide no additional benefit in terms of encouraging the desired behavior, and may incur an unnecessary system overhead cost resulting from implementing an unnecessarily large volume of communication traffic through the network. Therefore, in accordance with one embodiment of the present invention, the average number of neighbors for a node in the network is less than 100, in other embodiments it is less than 50, and in yet further embodiments it is less than 10. The reference to an average number of neighbors is intended to be representative of typical neighborhood sizes in a network. Outliers in the distribution of a neighborhood size can impact the statistical representation of a typical size in different ways. Thus, in accordance with one embodiment of the invention, the mean neighborhood size is less than 100, in other embodiments it is less than 50, and in yet further embodiments it is less than 10. In other embodiments, the median neighborhood size is less than 100, in other embodiments is less than 50, and in yet further embodiments is less than 10. Finally, in yet further embodiments, the mode neighborhood size is less than 100, in other embodiments it is less than 50, and in yet further embodiments it is less than 10.

As discussed above, in accordance with some embodiments of the present invention, a social network may influence behavior of people assigned to the network by communicating to each person information about actions taken by his/her neighbors. The person may be informed about his/her neighbors' actions in any suitable way, examples of which are described below.

In some embodiments of the present invention, a person assigned to a node may receive information via the social network only about actions of his/her neighbors (i.e., those people assigned to nodes directly connected to the person's node). Thus, in some embodiments, the social network does not provide any vehicle for a person in the network to communicate with any other people in the network other than his/her neighbors. As an example, FIG. 1 illustrates that a notification 106 may be sent to node 102A from its neighbor, node 102C. The notification may be presented in any suitable form. For example, the notification may be sent via e-mail, via Instant Messaging, via a text message, via a voice message, via a mailing or in any other suitable manner. In the embodiments of the present invention for use in connection with users of an on-line service, any of the above-described notification techniques can be employed. Alternatively, or in addition, the notification may be provided through the user's account for the on-line service, so that when the user accesses his/her account the user may receive the notification.

In accordance with one embodiment of the present invention, the notification may be communicated automatically, i.e., without the person who engaged in the behavior needing to take any action other than engaging in the behavior to cause the notification to be sent to his/her neighbors. In this respect, the reference to the notification being sent automatically refers to the actor needing to take no affirmative act other than engaging in the behavior at the time the relevant behavior is engaged in. In accordance with some embodiments of the present invention, a person added to the social network may not need to take any action at any time to be included in the social network. For example, in accordance with the embodiment directed to users of an online service, the techniques described herein can be used to automatically insert a user into a social network when the user first uses the online service (e.g., creates an account) without the user having the need, or, optionally, even the ability, to authorize inclusion in the social network either for the purpose of having the user's actions result in a communication to others in the network or to result in the user receiving notification about actions taken by others. However, the aspects of the present invention described herein are not limited in this way in any respect, as before being included in a social network (or at any time thereafter) a user may be provided with the option of whether to be included, so that his/her actions result in notifications to others and/or whether the user desires to receive notifications based upon actions by others.

In some embodiments of the present invention, each person in the social network is provided with information about his/her neighbors, although the present invention is not limited in this respect, as no such information need be provided. In those embodiments wherein information is provided to a user about his/her neighbors, such information can take and be provided in any suitable form, as the aspects of the present invention described herein are not limited in this respect. For example, in the embodiment for use in forming a social network among users of an on-line service, each user may be informed of his/her neighbors via the online service (e.g. via a web page that lists the users' "community friends") and may identify them in any suitable way, such as via their account names, another identifier, or other suitable way. In accordance with one embodiment of the present invention, a person who uses the on-line service (e.g., subscribes or creates an account) is entered into at least one node in the social network and assigned a list of people who are the person's neighbors or friends in the community established by the social network. As mentioned above, this may be done automatically for each person who uses the online service, may be performed automatically for a subset of people that use the online service selected in any desired way, may require authorization from the user or not, etc. In accordance with one embodiment of the present invention, a user is provided with no information about his/her neighbors other than an identifier for them. However, Applicants have appreciated that in some contexts, people are more likely to be influenced by the behavior of others that they believe to share some common traits relevant to the behavior in question. Therefore, in accordance with some embodiments of the present invention, each user may be provided with some information about his/her neighbors that may be selected because that information may be relevant to the user for influencing him/her to engage in certain behavior based upon actions via his/her neighbors (e.g., the neighbors adopting the relevant behavior). This information that may be shared among neighbors can be any suitable information, as the aspects of the present invention described herein are not limited in this respect. As discussed below, in some embodiments of the present invention, users may be assigned to various neighborhoods based upon some characteristics shared with their neighbors (examples of which are described below). In one embodiment of the present invention, some or all of the characteristics that are believed to be relevant in determining neighbors in the network may be shared so that a user is informed of some or all of the characteristics that may be employed in assigning his/her neighbors, although it should be appreciated that all embodiments of the present invention are not limited in this respect.

In accordance with the embodiment wherein a user is provided with information about his/her neighbors, this information may be provided on an individual basis for particular neighbors, or alternatively the user may be informed that all of his/her neighbors share some particular traits or characteristics. When information is provided on an individualized basis, then when a person receives a notification that a neighbor has engaged in a relevant behavior, the particular neighbor that engaged in the behavior may be identified in any suitable manner (e.g., via a name or an identifier). Alternatively, in accordance with embodiments wherein characteristics of neighbors are not provided on an individual basis, a notification of a neighbor engaging in a relevant behavior may identify the particular neighbor who engaged in the behavior in some embodiments, while in others the notification may simply inform the user that one of his/her neighbors has taken an action.

When the social network techniques described herein are employed with an on-line community, it should be appreciated that they provide users with a new type of on-line experience in which their interaction with the site is, in part, mediated by community-specific friendships that provide them with both information and social influence. The nature of the on-line service is not limited in any respect, nor is the type of behavior that is desired and may be encouraged by the social network (and be encouraged by the social network), as the techniques described herein can be employed with any suitable type of an online service and can be used to encourage any type of desired behavior. Examples of on-line services and desired behaviors with which the techniques described herein can be used can include on-line services that allow users to purchase a product or service, health-related sites, etc., and the desired behavior can include the purchasing of a product or service, membership to the online service, adopting positive health behaviors or decreasing behaviors adverse to one's health, etc. As stated above, the techniques described herein are not limited to use with users of an on-line service, and can be used for any group of people in any context.

It should be appreciated that the information received about actions of one's network neighbors via a social network in accordance with some embodiments differs from current user experiences on-line, where, for example, a buyer of a particular book may be simply informed that other users who bought that book also bought other identified books. In contrast, according to some embodiments of the invention, users may be informed about a behavior of other individuals selected to be their neighbors because they are similar to them in some respect relevant to the behavior (e.g., because they have the same or similar ages, food tastes, similar prior purchasing behavior, are actual geographical neighbors, etc.). As another example, users may be informed about a behavior of other individuals that are actually known to them (e.g., when members of social networking sites are informed about the behavior of people with whom they have volitionally established a link).

As mentioned above, the techniques described herein can be employed to implement social networks that promote any desired behavior. In some of the examples described above, a desired behavior (e.g., purchase of a product or service, engaging in activity to promote good health such as having a medical visit or procedure performed) is encouraged by informing a user when his/her neighbors engage in the desired behavior. However, the techniques described herein are not limited in this respect, as some behaviors may be encouraged through notification of other types of information. For example, if a desired behavior is smoking cessation, participants of a smoking cessation program may be notified when neighbors in the network (e.g., fellow members in the program) have passed various milestones and remain smoke-free. For example, members of a smoking cessation program may be notified periodically (e.g., weekly or at some other interval) about whether their network contacts are still not smoking. Such periodic notification may reinforce the desired behavior (i.e., smoking cessation).

It should be appreciated that smoking is merely one example of undesired behavior that a social network can be designed to reduce, with others including the consumption of too much energy, the creation of too much greenhouse gas, etc. In those examples, a social network can be configured to reduce the undesired behavior in any suitable way. As one example, users can be inserted into a social network of similar users and informed about specific other users actions may have taken to reduce energy consumption or greenhouse gas creation, may be informed periodically of other users continuing to adhere to a program to reduce energy consumption or greenhouse gas generation, and/or may be provided with information about a quantity of energy consumed or greenhouse gas generated by others in the network to create social pressure to compete with one's neighbors to reduce the undesired behavior.

As should be appreciated from the foregoing, the techniques described herein can provide notification of the behavior of neighbors in the network in any of numerous ways, including triggered notification when a particular behavior is engaged in or a change in a behavior occurs, and in some contexts periodic notification even if no change has occurred. Applicants have appreciated that such periodic notifications may be effective to reinforce a subscription to an continuing desired behavior, including maintaining a desired relationship (e.g., an on-line service such as a dating or shopping service, or another type of relationship such as subscription to a newspaper or membership to a magazine, a health club, a customer relationship for a retail store, etc.).

As should be appreciated from the foregoing, one or more social networks may be created to promote spreading of one or more types of behavior among people in the network. In some embodiments, the structure and parameters of the network may be tailored to effectively encourage whatever behavior is desired to be encouraged via the network.

Another application for the techniques described herein relates to players of massively multi-player games, wherein the techniques described herein may be employed to assign groups of players to nodes in a network. The groups of players embedded into a network may be associated in the game in any suitable way (e.g., as an army of players, as residents of a virtual city, etc.). Such a network (which may be the only one of its type or one of multiple such networks associating players in a game) may restrict at least some types of interactions between players to the selected subset of the player community embedded in the network. This exclusive communication vehicle can allow players to communicate to the exclusion of the other players in the game (e.g., to share exclusive information, collude to influence the behavior of others, etc). Unlike many existing on-line games, where everyone in a game interacts with any other active players on an equal footing, these networked relations may provide a foundation for what can be referred to as exclusive friendships and powerful peer influence dynamics, which may not possible in traditional group game playing. These restricted, network-based interactions may provide a vehicle for fostering privileged relationships and repeated interactions among otherwise anonymous users, which can produce novel kinds of trust and influence dynamics and create a new kind of user experience for members of on-line gaming communities.

Figure 2A:
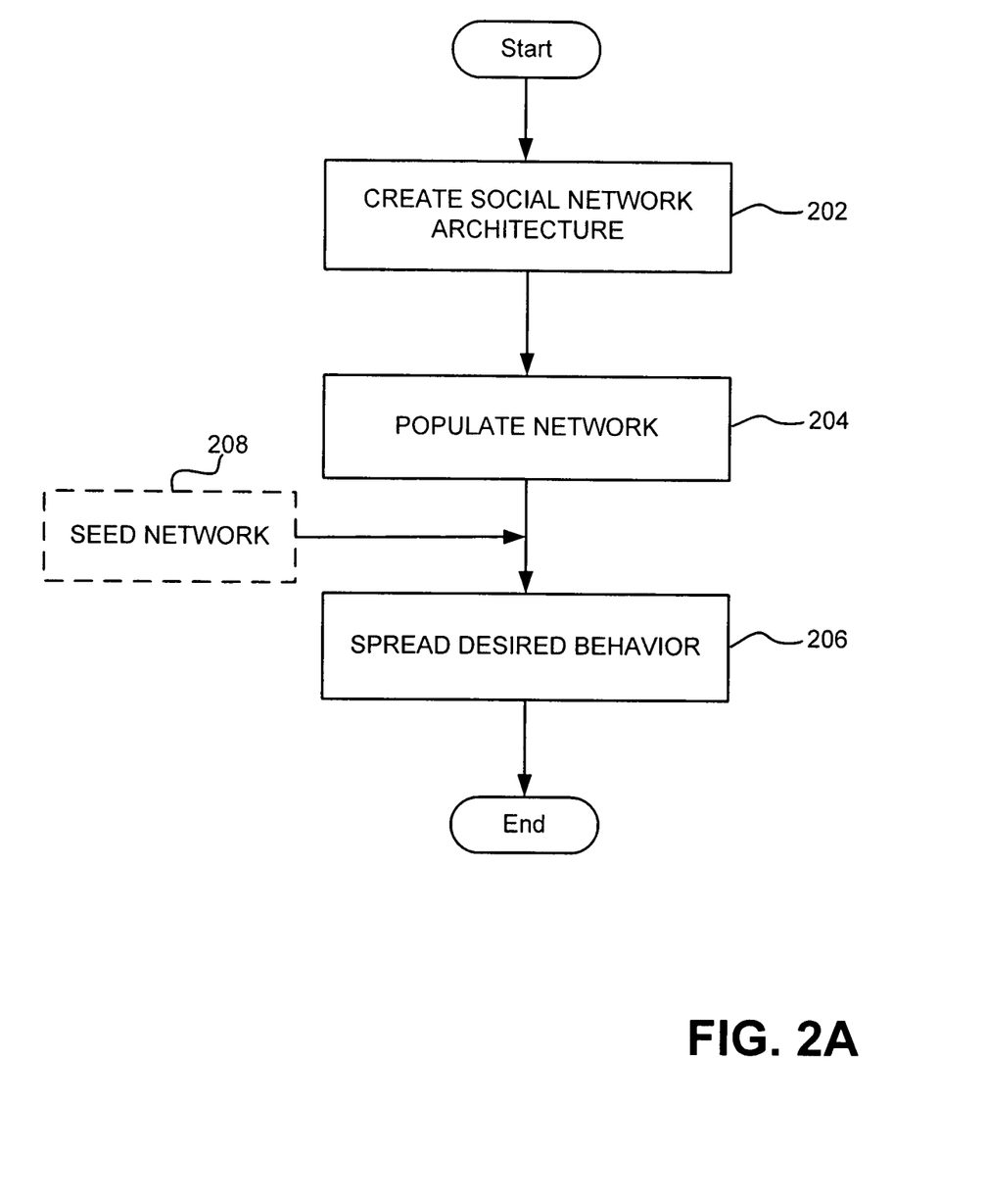
FIGS. 2A-2B are flow charts of a process of spreading desired behavior in a social network in accordance with one embodiment of the present invention.
Figure 2B:
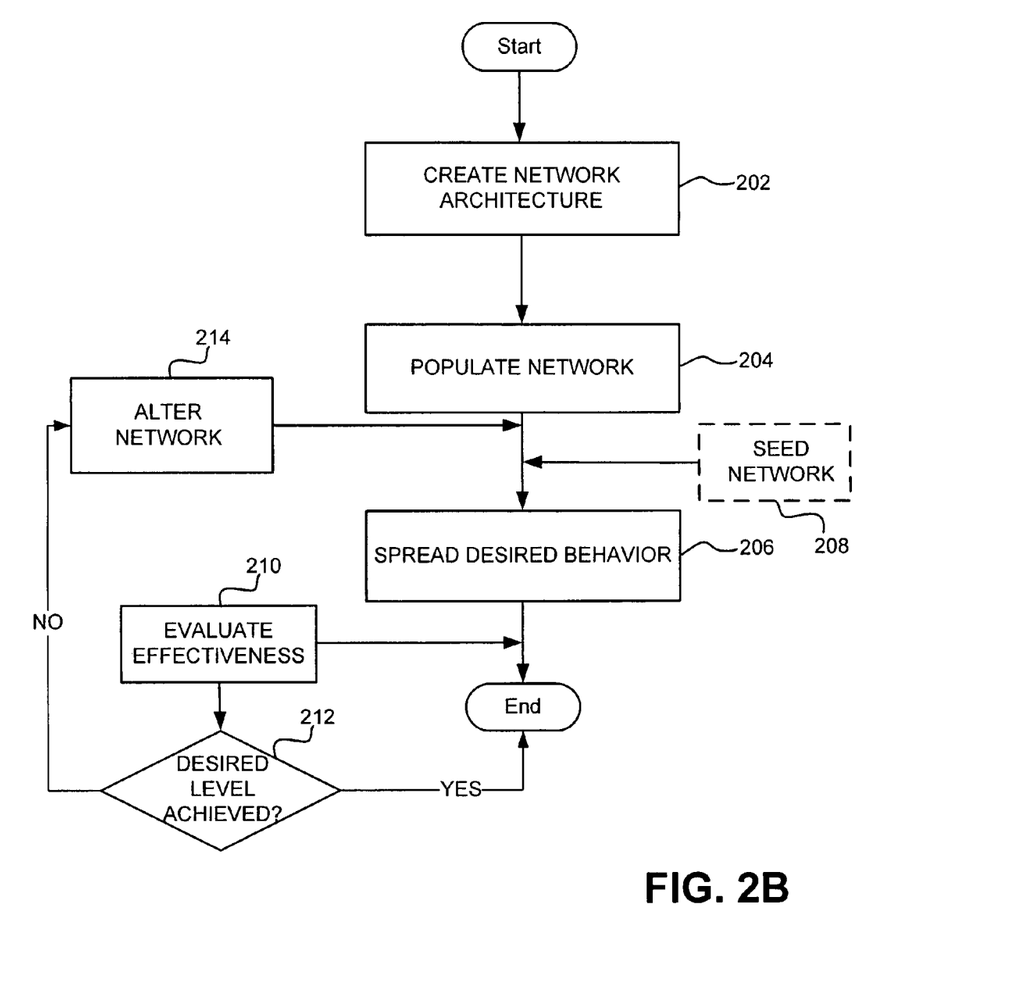

FIGS. 2A and 2B illustrate a method of using a social network to spread a desired behavior in accordance with some embodiments. In block 202, network architecture is created which may be done in any suitable way, examples of which are described herein. In some embodiments of the invention, the architecture of the network may be chosen based on the desired behavior to be encouraged (e.g., based on a behavior that a provider of an on-line service wishes to elicit from a community of the users of the service). As discussed above, embodiments of the invention provide a vehicle for an entity initiating and maintaining the network (e.g., a provider of an on-line service) to control or manipulate the interactions of the people in the network to foster the spread of one or more desired behaviors. Thus, an entity that initiates and maintains this social network can adopt a network architecture that is specifically selected to encourage the desired behavior. It should be appreciated that the specific network architecture and topology can have a significant influence on the effectiveness of the network for promoting certain desired behaviors. For example, networks with a large clustering coefficient and a large characteristic path length may have different implications for the diffusion of certain types of behavior than networks with a low clustering coefficient and a large degree distribution. These are just a few of the network parameters that can be considered (others are discussed above) when adopting a particular network topology to promote a specific desired behavior. The network architecture may take on any size depending upon the size of the desired community (e.g., ranging from under 10 nodes to multiple millions of nodes).

The network may then be populated by assigning users to one or more nodes of the network, as shown in block 204. In some embodiments described above, the users are account holders for an on-line computer service. However, it should be appreciated that the invention is not limited in this respect, and can be employed to implement a social network among any group of people in any context. The users, which may or may not be anonymous, may be assigned to the nodes in any suitable way.

In one embodiment, people can be assigned to previously specified network architecture at random, or using any other technique that does not seek to control assignment based on characteristics of the users. However, as an alternative, to provide more control over the users' interactions and of the network diffusion dynamics, in one embodiment, the nodes can be populated so as to optimize the diffusion of the desired behavior by selecting neighbors based upon some common characteristics relevant to the one or more behaviors that the social network is designed to promote. For example, in some embodiments, the nodes may be populated so as to optimize the similarity of neighbors in the network with respect to one or more characteristics relevant to the desired behavior. As discussed above, in some embodiments, the community members may be anonymous, although the aspects of the present invention described herein are not limited in this respect. Furthermore, as discussed above, in some embodiments the community interaction via the network may not start until the network is fully populated, although the aspects of the present invention described herein are not limited in this respect, as in some embodiments interaction among neighbors in a social network can begin as soon as neighbors have been assigned to nodes in the network.

As discussed above, community members in the network may be arranged (e.g., invisibly or not) in any way that facilitates interaction of members having similar characteristics to promote behavioral influence. For example, an assortative interaction (or "homophily") algorithm may be employed which finds an optimal configuration of people in the network so as to maximize the similarity (or dissimilarity, or randomness, etc., as desired) among neighbors. For example, the arrangement of users in the social network may be optimized so as to assign every user neighbors who are close to him/her in age, have similar educational backgrounds, and/or are otherwise similar in ways relevant to the behavior(s) the social network is intended to promote. In this respect, the particular characteristics that may be considered in assigning neighbors may differ depending upon the desired behavior as discussed further below. It should be appreciated that aspects of the present invention are not limited in this respect and that any suitable method can be used to populate a network in a way that provides spread of a desired behavior.

It should be appreciated that users can be arranged among nodes in a network based on any suitable characteristics. Examples of suitable characteristics include age, gender, educational background, political affiliation, cultural heritage, race, religion, body mass index, geographical location of residence, height, weight and/or any other suitable characteristics. Other examples of the characteristics relevant to the desired behavior may be interests, tastes, hobbies and others. Thus, each person's network neighbors can be as similar to, or as different from, him or her, as desired. The characteristics that are optimized on may be selected by an entity supervising the network to be most relevant to one or more types of behavior that is desired to be spread. For example, if it is desired to spread a behavior of buying a health product, grouping people by age and gender may be advantageous. If the goal is to spread interest in a new set of books recently available from a publisher, organizing people by education and hobby may be more salient.

In one embodiment of the invention, the structure of a social network defined in terms of its topological characteristics and the assignment of individuals to locations in the topology (e.g., based on their assortative interaction) can be optimized to facilitate emergence and spread of a desired behavior within the networked community.

Figure 4:
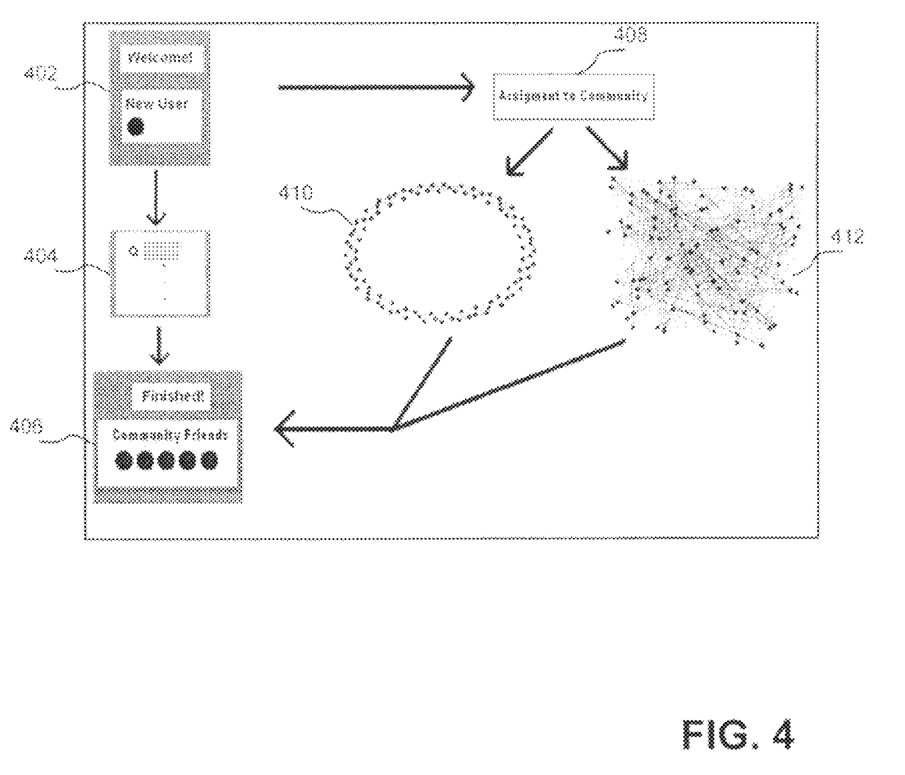
FIG. 4 is an illustration of embedding a user of an on-line computer service into one of two different network architectures in accordance with one embodiment of the present invention.

FIG. 4 shows an example of embedding individuals who join an on-line computer service into one of two (for purposes of illustration only) different network architectures, or communities, depending on the interests of the provider of the service. It should be appreciated that embedding individuals into a social network when they join an online service is merely one application for the techniques described herein, as a social network can alternatively be defined for an existing group of people (e.g., existing account holders for an online service). The information gathered from the user can be used for any purpose that the online service may desire, and, in one embodiment of the present invention, can be used to influence the architecture of a social network into which the user will be placed and/or can be used in selecting a node in a social network to which the user can be assigned. Thus, in some embodiments of the present invention, these decisions relating to the architecture of the network and/or the placement of a user within it, can be based solely upon information already collected by the online service provider for other reasons. However, in some embodiments of the present invention, the online service may collect information from a user solely to facilitate a determination of a network architecture and/or a node selection within a social network for the user. As described above, a social network can have any suitable topology (e.g., "scale-free", "small world", "regular", "random", etc.). A new user of an online service may be presented with a greeting 402 or any other acknowledgment of the user joining the service. The user may then be asked to provide information (e.g., by filling in a questionnaire 404 or any other suitable form (e.g., a survey form)) on certain of his or her characteristics, such as, for example, age, height, weight, address, hobbies, interests, tastes, etc. selected by the provider of the online service.

As shown in block 406, the user may be assigned to a list of persons (i.e., "friends") who may be selected in any suitable way (examples of which are described herein). For example, the friends may have similar characteristics, share common interests, or otherwise related to the user. The user may be enabled to communicate with his or her friends in any suitable way. In block 408, the user may be assigned to a node in the network where the user may be connected to his/her neighbors, which may be all or some of his or her "friends." This may be done in any suitable way, examples of which were described above. Two networks 410 and 412 of different structures are shown by way of example only and not to limit the scope of the invention. The networks provide social structure for people in the online community to interact and may foster behavioral diffusion through the community as described above.

As shown in FIG. 2A, after a network has been populated at block 204, a desired behavior may spread at block 206. It should be appreciated that information may be diffused through a social network in different ways. As discussed above, in one embodiment, the topology of a social network may be optimized to effectively diffuse a desired behavior, although all embodiments are not limited in this respect.

The structure of a social network (in terms of its topological characteristics) and the location of the individuals in the topology (in terms of assortative interaction) can be optimized to facilitate the emergence of a desired behavior within the network. For example, the following papers, each of which is included in the above-referenced provisional application and is hereby incorporated by reference in its entirety, show that some types of behavior that respond best to multiple sources of reinforcement (i.e., "complex contagions") diffuse better on clustered social networks than on random ones, while news and information that only require a single contact for propagation (i.e., "simple contagions") diffuse better on random networks: (1) D. Centola, V. M. Eguiluz, and M. W. Macy (2007) "Cascade dynamics of complex propagation," Physica A, 374:449-456; (2) D. Centola and M. W. Macy, "Complex contagions and the weakness of long ties," *American Journal of Sociology* (submitted, November 2006); and (3) D. Centola, "Failure in complex social networks."

There are a large variety of network topologies (e.g., scale-free, small world, regular, random, etc.) and each may have respective differences in its ability to propagate simple and complex contagions. In accordance with one embodiment of the present invention, the network implementation can be customized based upon the specific nature of the behavior that it is desired to have the social network diffuse.

Figure 3:
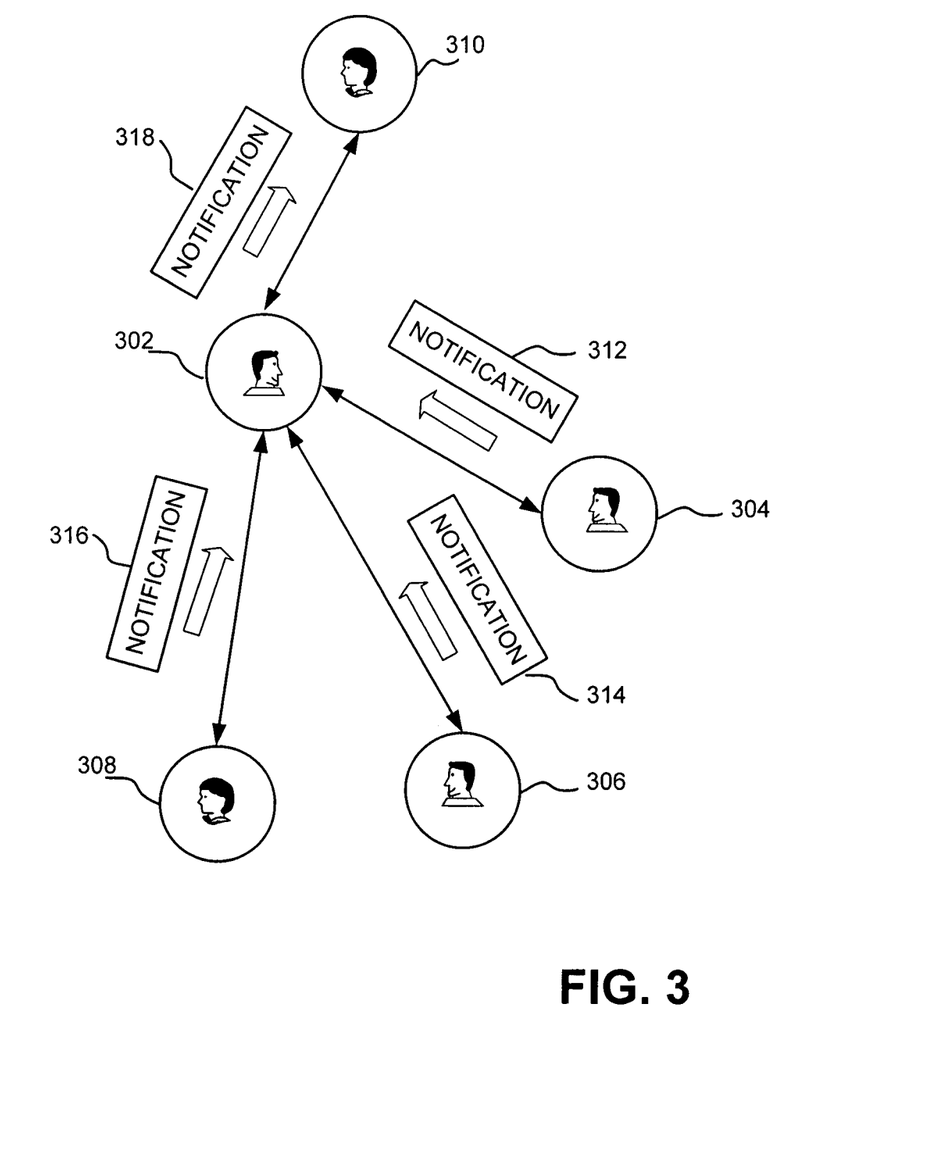
FIG. 3 is a conceptual illustration of a complex contagion.

FIG. 3 illustrates the concept of a complex contagion. In the example illustrated, a person occupying a node 302 (e.g., an account holder of an on-line computer service) typically will not adopt a certain behavior until he/she is informed that the behavior has been adopted by three of his/her neighbors. Thus, once notifications 312, 314 and 316 are received via a network informing the person assigned to node 302 that the behavior has been adopted by persons assigned to nodes 304, 306 and 308, it can be anticipated (with some probability) that the person at node 302 will adopt the behavior. Once the user at node 302 adopts the behavior, a notification 318 is sent to his/her neighbors, illustrated in FIG. 3 by the notification being sent to a single neighbor 310. It should be appreciated from the foregoing, that through the adoption of the behavior by people in the network, notifications are sent to other users which encourages them to adopt the behavior as well, and to also send notification of that adoption to others. In this manner, the behavior can diffuse throughout the network.

As mentioned above, in accordance with one embodiment of the present invention, the structure of the network can be selected to optimize the desired behavior that the network is intended to encourage. Two examples of network configurations are shown in FIG. 4, a random network architecture 412 and a non-random clustered network 410. As discussed above, it has been appreciated that behavior that requires multiple sources of reinforcement (i.e., complex contagions) may diffuse better on a clustered social network such as that shown at 410, whereas some behaviors that require only a single point of contact for propagation (i.e., simple contagions) may diffuse better on a random network such as that shown at 412. Thus, in accordance with one embodiment of the present invention, the particular network topology used can be customized to facilitate diffusion of the particular type of behavior. It should be appreciated that although two network topologies are shown for example in FIG. 4 that numerous variations of these and other network topologies are possible, as the aspects of the present invention are not limited to use with any particular network topologies. As mentioned above, in accordance with one embodiment of the present invention, if it is desired to encourage two or more different types of behavior within a group of people, two or more different network topologies can be adopted, each optimized to the particular behavior to be encouraged. Thus, referring the example of FIG. 4, a user of the on-line service can be assigned to both of social networks 410 and 412 to encourage adoption of different types of behavior. In some networks configured to propagate a desired behavior via complex contagions, the behavior may be spread more efficiently than in random architecture networks.

Figure 5:
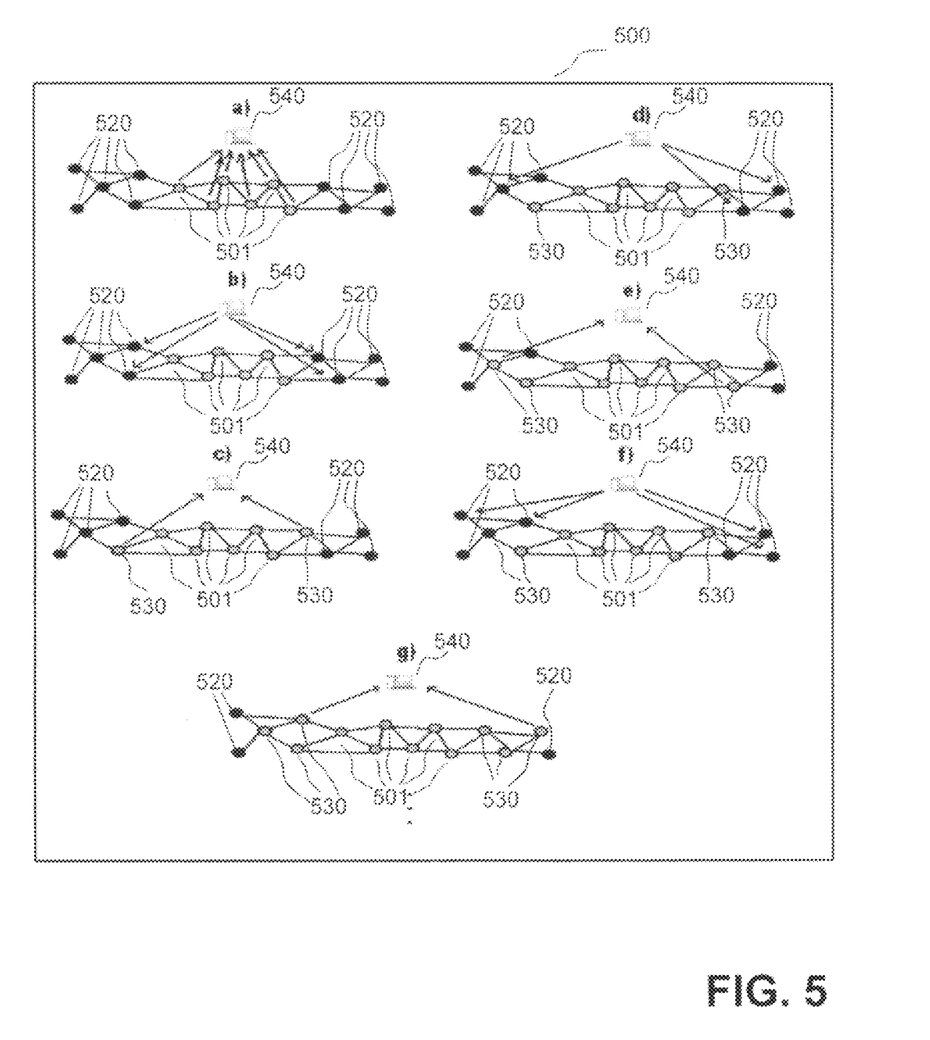
FIG. 5 is an illustration of "seeding" a network to propagate behavior change in the network in accordance with one embodiment of the present invention.

In one embodiment of the invention, a network may be optionally "seeded," to initiate spreading a desired behavior, as shown at block 208 of FIG. 2A. FIG. 5 illustrates a process 500 of seeding the network with a few individuals who are, for example, members of an on-line computer service, people who are particularly eager to try new products and/or services, people who may have high influence on others (e.g., when individuals in the network are not anonymous), or any other individuals that may be used to initiate adopting the desired behavior. In FIG. 5*a*, an initial group of 6 nodes 501 are seeded, and the remaining nodes 520 are not. When each of the seeded individuals 501 exhibits the desired behavior (e.g., buys the product, signs up for a service, etc.), as indicated by arrows to a service provider (e.g., a server) 540 at subfigure (a), the service provider may automatically (e.g., via the server) send a notification to the individual's neighbors (e.g., community friends) indicating that the person has adopted the behavior, as shown by the arrows away from the service provider 540 in FIG. 5*b*. Alternatively, this notification may be sent directly from the person who had adopted the behavior to his or her neighbors, without using the service provider as an intermediary as discussed above. The higher the number of people who adopt the behavior, the more reinforcing signals are received, which make others to do the behavior (shown as nodes turning into lighter shade) and informs the provider of this (shown as arrows to the provider). The process continues, as shown in subfigures (b)-(g), allowing local network neighborhoods to act as vehicles for a global spread of the desired behavior. The example shown in FIG. 5 is one of a complex contagion, wherein multiple notifications typically are required to encourage a user to adopt the desired behavior. In FIGS. 5*a-g*, the behavior spreads through the network, with some of the nodes that were not initially seeded as shown at 520 ultimately being influenced by notifications received from the service provider 540 of the actions of their neighbors until those nodes adopt the behavior as shown at 530. It should be appreciated from FIGS. 5*a-g* that the more people adopt the behavior, the more reinforcing signals are propagated through the network, which encourages others to perform the behavior as well, which in turn results in notifications being sent to their neighbors. This process continues through the progression of FIGS. 5*a-g* allowing local network neighbors to act as vehicles for a global spread of the desired behavior.

In accordance with an alternate embodiment of the invention, after initially being created, a social network can be modified and altered at some later time for any of numerous reasons. For example, in one embodiment of the present invention, the social network may be altered at a later point in time to increase its effectiveness, either overall or to increase the likelihood of having any non-adopters of the desired behavior adopt the behavior. The altering of the network can include a re-wiring of the network architecture to create differences in the node and its topology and/or the reassignment of individuals amongst nodes, as the aspects of the present invention relating to altering the social network are not limited in this respect.

In accordance with one embodiment of the present invention, alterations to the social network can be guided by the prior behavior of users within the network. For example, after some initial period can be determined in any suitable way (e.g., based upon a specified period of time, upon a number of percentage of users adopting the behavior, etc.), the network can be altered so that non-adopters all are surrounded by people known to have adopted the desired behavior.

When changes are made to the network so that one or more neighbors for a person in the network have changed, in one embodiment, the person will be notified that his/her neighbors have changed, while in other embodiments, no such notification may be provided. One illustrative process for evaluating the effectiveness of a previously-created social network and optionally altering it is illustrated in FIG. 2B. It should be appreciated that the aspect of the present invention that relates to evaluating and potentially altering a social network can be implemented in numerous ways, such that the illustrative process shown in FIG. 2B is provided merely as an example.

In the illustrative process of FIG. 2B, a process for evaluating the effectiveness of a social network is included in a process like that of FIG. 2A that initially creates and optionally seeds a social network. However, it should appreciated that the process for evaluating and potentially altering the network can be implemented not only as part of a same process, but also may be implemented as a separate process. Initially, at block 210, an evaluation is made of the effectiveness of the social network. This evaluation may be performed in any suitable manner based upon any criteria, as the aspect of the present invention that relates to evaluating and potentially modifying a social network is not limited to any particular evaluation parameters. At block 212, the process determines whether a desired level of effectiveness for the social network has been achieved. If so, then, in the embodiment of FIG. 2B, the process may simply terminate. It should be appreciated that the evaluation process may therefore perform an evaluation not only at a particular point in time, but may be called repeatedly, if desired. In an alternate embodiment, the process itself may be one that repeatedly re-evaluates the effectiveness of a social network.

As discussed above, the evaluation of the effectiveness of the social network may be performed on an overall level. Alternatively, in accordance with one embodiment of the present invention, even in a social network that in a global sense has been extremely effective in spreading the desired behavior, alterations may be made to modify the social network specifically to target any non-adopters.

If it is determined at block 212 that the social network is not performing at a sufficient level for promoting the desired behavior or that altering of the network is desired for any reason, the process proceeds to block 412 wherein the network is altered. The network may be altered in any suitable way as discussed above, including by altering the network topology itself (e.g., by re-wiring edges connecting existing nodes, by adding or deleting edges or nodes, etc.) and/or by reassigning particular individuals to different nodes. The alterations to the social network may be customized, in some embodiments, based upon the nature of the deficiency in the performance of the pre-existing network, examples of which were discussed above, including by surrounding non-adopters with people known to have adopted the desired behavior.

It should be appreciated that alterations to the network may also involve changes to the specification of the behavior that is recognized as exhibiting the desired behavior and/or changes to the notification techniques. For example, instead of the desired behavior constituting the signing up by the user for a single service, the trigger for a notification to a person's neighbors could be that the person sign up for two or more services, or the modification could reduce the thresholds for notification. As the thresholds for notification may be relevant to the diffusion of the desired behavior, the parameters defining the threshold for notification can be altered to tune the performance of the social network.

As another example, it may be determined that different types of notifications may have a different effect on the diffusion of the desired behavior through the network, so that modifications to the notification (e.g., by modifying the information about the desired behavior or about the particular individuals who took the action that resulted in the notification) can be made.

Any of the aspects of the present invention described herein may in principle, be implemented in addition to any existing social network connections that a user may have. For example, users of a social networking site, or of a massively multi-player game, could be assigned to pre-specified network topologies that co-exist with their current networking ties.

It should be appreciated that in some embodiments of the present invention, a social network architecture may be established without regard to which particular individuals will be assigned to particular nodes. This is to be contrasted with conventional social networks which take on a structure driven by the behavior of particular individuals. By contrast, some embodiments of the present invention employ a network architecture that is established by determining a pre-specified topology prior to assigning otherwise anonymous users to nodes of the network. Similarly, unlike conventional social networks, in some embodiments of the present invention, the network architecture may be established prior to any communication among users via the social network so that each user is assigned neighbors and cannot, based on his/her actions, create a new neighbor in the social network by communicating with another. Of course, the present invention is not limited in this respect, as in some embodiments the user may be enabled to volitionally create new neighbors and/or initiate communications with his/her neighbors.

As discussed above, Applicants have appreciated that different types of network architectures may be better suited to propagating two types of behaviors. In accordance with one embodiment of the present invention, a network architecture is established that is non-random and propagates complex contagions more efficiently than a random architecture.

The techniques described herein can be implemented on any suitable computer system, including a single device or distributed across a plurality of devices coupled in any suitable way.

Figure 6:
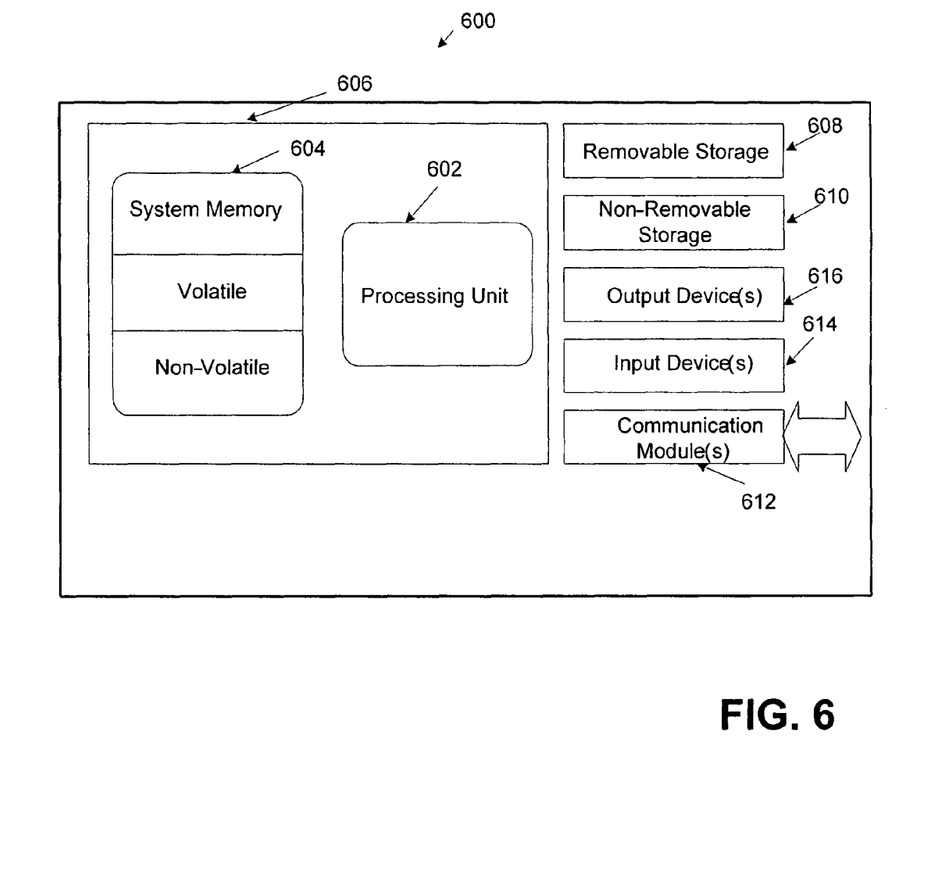
FIG. 6 is a block diagram of an illustrative computer system on which embodiments of the invention may be implemented.

FIG. 6 illustrates an exemplary computer system for implementing some embodiments. FIG. 6 illustrates computing device 600, which includes at least one processor 602 and memory 604. Depending on the configuration and type of computing device, memory 604 may be volatile (such as RAM), non-volatile (such as ROM, flash memory, etc.) or some combination of the two.

Device 600 may include at least some form of computer readable media. By way of example, and not limitation, computer readable media may comprise computer storage media. For example, device 600 may also include storage (removable and/or non-removable) including, but not limited to, magnetic or optical disks or tape. Such additional storage is illustrated in FIG. 6 by removable storage 608 and non-removable storage 610. Computer storage media may include volatile and nonvolatile media, removable, and non-removable media of any type for storing information such as computer readable instructions, data structures, program modules or other data. Memory 604, removable storage 608 and non-removable storage 610 all are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 600. Any such computer storage media may be part of device 600. Device 600 may also contain network communications module(s) 612 that allow the device to communicate with other devices via one or more communication media. By way of example, and not limitation, communication media may include wired media such as a wired network or direct-wired connection, and wireless media such as acoustic, RF, infrared and other wireless media. Network communication module(s) 612 may be a component that is capable of providing an interface between device 600 and the one or more communication media, and may be one or more of a wired network card, a wireless network card, a modem, an infrared transceiver, an acoustic transceiver and/or any other suitable type of network communication module.

In one embodiment, the techniques described herein may be implemented via software code that is stored on one or more computer readable media and includes instructions that when executed (e.g., on processor 602) implement parts or all of the techniques described herein.

Device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be appreciated that the techniques described herein are not limited to executing on any particular system or group of systems. For example, embodiments may run on one device or on a combination of devices. Also, it should be appreciated that the techniques described herein are not limited to any particular architecture, network, or communication protocol.

The techniques described herein are not limited in their application to the details of construction and the arrangement of components set forth in the following description or illustrated in the drawings. The techniques described herein are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use with an on-line computer service having a plurality of account holders that each has at least one account with the on-line computer service, the method comprising an act of:
(A) creating a previously non-existent social network among at least a subset of the plurality of account holders for facilitating a spread of desired behavior among the subset of the plurality of account holders by:
(A1) creating a network architecture comprising a set of nodes and a set of edges, wherein each one of the edges connects at least two of the set of nodes and specifies a path for a flow of information between the nodes connected by the one of the edges, wherein the network architecture is designed to facilitate and control interactions of the at least some of the subset of the plurality of account holders through the previously non-existent social network, wherein the created network architecture is pre-defined prior to any communication among account holders of the plurality of account holders via the previously non-existent social network so that each account holder is assigned neighbors and cannot, based on user action, create a new neighbor in the social network by communicating with another account holder; and
(A2) populating the created network architecture by:
selecting, for each of the account holders in the at least a subset of the plurality of account holders, at least one node of the set of nodes, the subset of the plurality of account holders comprising a first account holder and a second account holder, wherein the selecting comprises selecting a first node from the set of nodes for the first account holder and a second node from the set of nodes for the second account holder, the first node having a first identifier and the second node having a second identifier, the second node being directly connected to the first node via at least one of the set of edges, and
associating the first account holder with the first node and the second account holder with the second node so that when at least one desired behavior is taken by the first account holder assigned to the first node, information relating to the at least one desired behavior is communicated to at least the second account holder assigned to the second node that is directly connected via the at least one of the edges to the first node, wherein the first account holder is associated with the first node by associating the first identifier with the first account holder, and wherein the second account holder is associated with the second node by associating the second identifier with the second account holder.

2. The method of claim 1, wherein the act (A1) comprises establishing the network architecture without regard to which particular account holders will be assigned to which particular nodes.

3. The method of claim 1, wherein the act (A1) comprises creating the network architecture to encourage a desired behavior among the at least a subset of the plurality of account holders.

4. The method of claim 3, wherein the desired behavior is desired by a provider of the on-line computer service.

5. The method of claim 4, wherein the desired behavior is a purchase of one or more goods and/or services via the on-line computer service.

6. The method of claim 1, wherein the act (A1) comprises creating the network architecture to be a non-random architecture that propagates complex contagions more efficiently than a random architecture.

7. The method of claim 1, wherein account holders assigned to nodes connected via at least one edge are neighbors in the social network;
wherein the act (A1) comprises creating the network architecture to constrain communication among account holders via the social network so that each account holder can communicate, via the social network, only with his or her neighbors.

8. The method of claim 1, wherein account holders assigned to nodes connected via at least one edge are neighbors in the social network;
wherein the act (A1) comprises creating the network architecture so that an average number of neighbors per account holder is less than 50.

9. The method of claim 1, wherein account holders assigned to nodes connected via at least one edge are neighbors in the social network;
wherein the act (A1) comprises creating the network architecture so that an average number of neighbors per account holder is less than 10.

10. The method of claim 1, wherein account holders assigned to nodes connected via at least one edge are neighbors in the social network;
wherein the act (A1) comprises creating the network architecture to constrain communication among account holders via the social network so that each account holder can only communicate with pre-defined neighbors via the social network.

11. The method of claim 1, wherein account holders assigned to nodes connected via at least one edge are neighbors in the social network;
wherein the act (A1) comprises creating the network architecture to encourage at least one behavior among the at least a subset of the plurality of account holders that is desired by a provider of the on-line computer service; and
wherein the act (A2) comprises populating the network architecture by assigning each of the account holders in the at least a subset of the plurality of account holders to at least one of the plurality of nodes in a manner that promotes similarity between neighbors in at least one characteristic that is relevant to the desired at least one behavior.

12. The method of claim 11, wherein the at least one characteristic that is relevant to the desired at least one behavior comprises age, gender, educational background, political affiliation, cultural heritage, race, religion, body mass index, geographical location of residence, height and/or weight.

13. The method of claim 11, wherein the at least one characteristic that is relevant to the desired at least one behavior comprises at least one interest, taste and/or hobby.

14. The method of claim 1, wherein account holders assigned to nodes connected via at least one edge are neighbors in the social network;
wherein the act (A2) comprises populating the network architecture by assigning each of the account holders in the at least a subset of the plurality of account holders to at least one of the plurality of nodes by applying at least one homophily rule.

15. The method of claim 11, further comprising acts of:
(B) evaluating effectiveness of the social network for encouraging the at least one behavior; and (C) when it is determined that the network is not performing at a sufficient level for encouraging the behavior, altering the social network.

16. The method of claim 15, wherein the act (C) comprises altering the network architecture to make changes to a manner in which the set of edges connects the set of nodes.

17. The method of claim 15, wherein the act (C) comprises altering the assignment of the at least a subset of account holders among the nodes.

18. The method of claim 1, wherein account holders assigned to nodes connected via at least one edge are neighbors in the social network, and wherein the act (A) comprises providing at least one account holder with information about at least one of his or her neighbors in the social network.

19. The method of claim 1, wherein the act (A) comprises creating the social network so that when the at least one action is taken by the first account holder the information relating to the at least one action is communicated to the at least one second account holder along with information about the first account holder.

20. The method of claim 1, wherein account holders assigned to nodes connected via at least one edge are neighbors in the social network;
wherein the act (A1) comprises creating the network architecture to encourage at least one behavior among the at least a subset of the plurality of account holders that is desired by a provider of the on-line computer service; and
wherein the method further comprises an act of:
(B) seeding the social network to encourage a propagation through the network of communications among neighbors to encourage the at least one desired behavior.

21. The method of claim 1, wherein the act (A1) comprises creating the network architecture to have statistical properties that are unaffected by behavior of the at least a subset of account holders.

22. The method of claim 21, wherein the statistical properties comprise a clustering coefficient, frequency of wide bridges, length, the fraction of closed triads given the possible number of closed triads, the mean geodesic between all nodes, the average fraction of neighborhood overlap between non-neighbors, and/or the distribution of degree centrality in the network.

23. A method for use with an on-line computer service having a plurality of account holders that each has at least one account with the on-line computer service, the method comprising acts of:
(A) assigning a pre-specified network topology of interpersonal social ties to otherwise anonymous users who comprise at least a subset of the plurality of account holders for facilitating a spread of desired behavior among the subset of the plurality of account holders by:
(A1) creating a network architecture comprising a set of nodes and a set of edges, wherein each one of the edges connects exactly two of the set of nodes and specifies a path for a flow of information between the nodes connected by the one of the edges, the network architecture comprising a pre-specified degree distribution, clustering coefficient, characteristic path length, and average bridge width between nodes, wherein the network architecture is designed to facilitate and control interactions of the at least some of the subset of the plurality of account holders through the network architecture, wherein the created network architecture is pre-defined prior to any communication among account holders of the plurality of account holders via the previously non-existent social network so that each account holder is assigned neighbors and cannot, based on user action, create a new neighbor in the social network by communicating with another account holder; and
(A2) populating the created network architecture by:
selecting, for each of the account holders in the at least a subset of the plurality of account holders, at least one node of the set of nodes, the subset of the plurality of account holders comprising a first account holder and a second account holder, wherein the selecting comprises selecting a first node from the set of nodes for the first account holder and a second node from the set of nodes for the second account holder, the first node having a first identifier and the second node having a second identifier, the second node being directly connected to the first node via at least one of the set of edges, and
associating the first account holder with the first node and the second account holder with the second node so that when at least one desired behavior is taken by the first account holder assigned to the first node, information relating to the at least one desired behavior is communicated to at least the second account holder assigned to the second node that is directly connected via the at least one of the edges to the first node, wherein the first account holder is associated with the first node by associating the first identifier with the first account holder, and wherein the second account holder is associated with the second node by associating the second identifier with the second account holder.

24. The method of claim 23, wherein people assigned to nodes connected via at least one edge are neighbors in the social network; and
wherein the method further comprises an act of providing at least a first account holder from among the subset of account holders with information about his or her neighbors in the social network.

25. The method of claim 24, wherein the actual identities of the neighbors for the first account holder are not provided to the first account holder so that the neighbors are anonymous.

26. The method of claim 23, wherein people assigned to nodes connected via at least one edge are neighbors in the social network; and
wherein social interaction via the social network is constrained to the neighbors for an account holder so that an account holder cannot receive direct contact, via the social network from any account holder who is not a neighbor.

27. The method of claim 23, wherein people assigned to nodes connected via at least one edge are neighbors in the social network; and
wherein behavior of an account holder is communicated to his or her neighbors along with information identifying the specific account holder who did the behavior.

28. The method of claim 23, wherein people assigned to nodes connected via at least one edge are neighbors in the social network; and
wherein when an account holder engages in a behavior, the account holder's neighbors are automatically informed of the behavior without the account holder needing to take any action other than selecting the behavior to trigger informing his or her neighbors.

* * * * *